3,431,341
BACTERIA INHIBITING COMPOSITION CONTAINING POLYMIX B AND O-CARBAMYL-D-SERINE
Robert S. Baldwin, Montezuma, Ind., assignor to Commercial Solvents Corporation, New York, N.Y., a corporation of Maryland
No Drawing. Filed June 9, 1967, Ser. No. 644,807
U.S. Cl. 424—177            1 Claim
Int. Cl. A61k 27/00

ABSTRACT OF THE DISCLOSURE

A combination of O-carbamyl-D-serine and polymyxin having therapeutic value against bacteria which utilize D-alanine as a growth factor.

SUMMARY OF THE INVENTION

This invention relates to a composition having enhanced inhibitory activity on bacterial cell growth. In a particular aspect, this invention relates to a combination of O-carbamyl-D-serine and polymyxin in proportions therapeutically effective against bacteria which utilize D-alanine as a growth factor.

The inhibition of bacterial cell growth is an important therapeutic measure in the curtailment of infections. Certain substances, e.g. p-amino benzoic acid, are utilized by and promote growth and/or reproduction of the cells. Other substances of similar chemical configuration, e.g. sulfonamides, are absorbed, but are not utilizable, by the cell for growth. When a sulfonamide is present, the cells, failing to differentiate between them, absorb the sulfonamide along with the p-amino benzoic acid. The absorption of the sulfonamide, which is not utilizable, results in a deficiency of growth factors in the cells, a condition which is deleterious to cell growth and thus cell growth is inhibited. The sulfonamide is referred to as a "competitive antagonist" for the p-amino benzoic acid in connection with cell growth.

D-alanine is a component of cell wall protein in cells of many Gram-negative and Gram-positive microorganisms which cause infection, for instance *Salmonella typhimurium*, *Streptococcus pyogenes* and *Diplococcus pneumoniae*. D-alanine is therefore essential for growth of the bacteria and is usually classed as a growth factor. Although the compound O-carbamyl-D-serine (OCS) is reported to be a competitive antagonist for the D-alanine site in the cell wall, its therapeutic use in this connection has not been completely satisfactory in infections caused by bacteria which utilize D-alanine as a growth factor. For example, in the tests reported in Example 1 below, OCS was relatively ineffective in mice infected with *S. typhimurium*, even at doses of 30 mg. per mouse. Polymyxin is a known antibiotic effective against many types of bacteria. However, it must be used in relatively high doses which may sometimes be undesirable.

It is an object of this invention to provide a composition having enhanced inhibitory activity on bacterial cell growth.

A second object of this invention is to provide a combination of O-carbamyl-D-serine and polymyxin in proportions therapeutically effective against bacteria which utilize D-alanine as a growth factor.

Another object of this invention is to provide a method of treating a subject infected with a bacteria which utilizes D-alanine as a growth factor.

It has been discovered that bacterial infections caused by bacteria utilizing D-alanine as a growth factor, e.g. as a cell-wall component, can be effectively inhibited by administration of a combination of polymyxin and O-carbamyl-D-serine in a ratio of about 20–30 mg. of O-carbamyl-D-serine to 40–60 units of polymyxin. Optimum effectiveness is obtained when the ratio of O-carbamyl-D-serine to polymyxin is about 20–30 mg. per 50 units.

This discovery is especially surprising because, although polymyxin is effective against bacterial growth in large concentrations, as for instance 200 units per mouse, it is relatively ineffective at the lower concentrations of the present invention, for example, 50 units per mouse.

DETAILED DESCRIPTION

The combination of this invention provides a method of treating subjects infected with bacteria which utilize D-alanine as a growth factor by administering the combination to the subject. Specific bacteria include, but are not limited to, *Salmonella typhimurium*, *Streptococcus pyogenes*, and *Diplococcus pneumoniae*.

The dosage of the composition of the invention administered to infected subjects will vary depending upon the particular ratio of O-carbamyl-D-serine and polymyxin selected, the body weight of the subject and whether single or multiple dosages are contemplated. Ordinarily, the dosage of the composition administered falls in the range of about 1 to 700 mg., preferably 25 to 500 mg. per kg. weight of the subject per day. Administration can be intramuscular, subcutaneous or oral, although intramuscular administration is preferred for most infections. Polymyxin is virtually unabsorbed from the gastrointestinal tract, so oral administration is unsuitable for systemic therapy.

The term polymyxin is intended to mean polymyxin B. It is available commercially as the sulfate salt in pharmaceutical grade quality. Highly purified polymyxin B sulfate has a potency of 10,000 units of polymyxin per milligram of the salt, but the product of commerce is usually somewhat lower, for example, 6000–7000 units/mg. Because of possible variation in potency, the quantity of polymyxin is expressed in terms of units instead of milligrams. The O-carbamyl-D-serine used in the practice of this invention can be prepared in high purity by any suitable means, e.g. by the method of G. Hagemann, U.S. Patent 2,885,433. It should be of pharmaceutically acceptable quality.

The following examples further illustrate the invention.

Example 1

Seven groups of 10 mice, each weighing about 20 g., were each in like manner inoculated by intraperitoneal injection of 0.2 cc. of a $10^{-3}$ dilution of a 24 hour culture of *Salmonella typhimurium*. An aqueous solution of either polymyxin B sulfate (P. in the following table), O-carbamyl-D-serine (OCS in the table), or a combination of the two in the amounts shown in Table 1 below was administered two hours later and a second dose six hours after the first. The survivors in each group were recorded after 24 hours, 34 hours and 50 hours. The results of the tests are given in Table 1. One group of five animals was inoculated but not treated.

TABLE 1

| Group No. | Dose, per mouse | | Survivors (hrs.) | | |
|---|---|---|---|---|---|
| | P., units | OCS, mg. | 24 | 34 | 50 |
| 1 | 50 | | 10/10 | 9/10 | 7/10 |
| 2 | 100 | | 10/10 | 10/10 | 9/10 |
| 3 | 200 | | 10/10 | 10/10 | 10/10 |
| 4 | | 30 | 10/10 | 4/10 | 0/10 |
| 5 | 25 | 30 | 10/10 | 8/10 | 3/10 |
| 6 | 50 | 30 | 10/10 | 10/10 | 10/10 |
| 7 | 100 | 20 | 10/10 | 10/10 | 10/10 |
| 8 | 0 | 0 | 0/5 | | |

These data show that O-carbamyl-D-serine alone was ineffective when employed at a dosage of 30 milligrams per mouse. Polymyxin, although quite effective when administered in 200 or 100 units per mouse, gave relatively poor protection at 50 units per mouse. The combination of 30 milligrams of O-carbamyl-D-serine per mouse and 50 units of polymyxin per mouse, however, unexpectedly provided protection equal to that obtained with 100 units of polymyxin.

The data on the Group 5 mice demonstrate that use of 25 units of polymyxin with 30 milligrams of O-carbamyl-D-serine does not provide the desired protection.

Example 2

The experiment of Example 1 was repeated except that the second dose was administered 19½ hours after the first. The results are given in Table 2.

TABLE 2

| Group No. | Dose, per mouse | | Survivors (hrs.) | |
|---|---|---|---|---|
| | P., units | OCS, mg. | 21 | 45 |
| 1 | 50 | | 1/10 | 1/10 |
| 2 | 100 | | 10/10 | 7/10 |
| 3 | 200 | | 10/10 | 10/10 |
| 4 | | 20 | 5/10 | 1/10 |
| 5 | 25 | 20 | 9/10 | 3/10 |
| 6 | 50 | 20 | 9/10 | 7/10 |
| 7 | 50 | 10 | 9/10 | 5/10 |
| 8 | 100 | 5 | 10/10 | 9/10 |
| 9 | 0 | 0 | 0/5 | |

These data show that O-carbamyl-D-serine alone was ineffective when employed at 20 mg. per mouse. Polymyxin was quite effective at 200 units per mouse, as would be expected from Example 1, but gave relatively poor protection at 100 units and was relatively ineffective at 50 units. The combination of 20 mg. of OCS with as little as 25 units of polymyxin per mouse unexpectedly provided protection superior to 50 units of polymyxin and the combination of 20 mg. OCS with 50 units polymyxin was about equal to the protection obtained with 100 units polymyxin.

I claim:
1. A bacteria inhibiting composition comprising polymyxin B and O-carbamyl-D-serine in a ratio of about 50 units of polymyxin to about 20 to 30 milligrams of O-carbamyl-D-serine.

References Cited

UNITED STATES PATENTS 2,565,057   8/1951   Ainsworth et al. _____ 167—65.02

OTHER REFERENCES

N.N.D., New and Nonofficial Drugs, 1963, J. B. Lippincott Co., Philadelphia, pp. 150–152.

Okami et al.: The Journal of Antibiotics, Series A, XV–3, May 1962, pp. 147–151.

Tanaka et al.: The Journal of Antibiotics, Series A, XVI–6, November 1963, pp. 217–221.

ALBERT T. MEYERS, *Primary Examiner*.

J. D. GOLDBERG, *Assistant Examiner*.